US012427935B2

(12) United States Patent
Shimizu et al.

(10) Patent No.: US 12,427,935 B2
(45) Date of Patent: Sep. 30, 2025

(54) BRAIDED MEMBER AND WIRE HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Takeshi Shimizu, Yokkaichi (JP); Daisuke Hashimoto, Yokkaichi (JP); Jisung Kim, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 162 days.

(21) Appl. No.: 18/039,804

(22) PCT Filed: Nov. 24, 2021

(86) PCT No.: PCT/JP2021/043075
§ 371 (c)(1),
(2) Date: Jun. 1, 2023

(87) PCT Pub. No.: WO2022/124081
PCT Pub. Date: Jun. 16, 2022

(65) Prior Publication Data
US 2024/0025358 A1 Jan. 25, 2024

(30) Foreign Application Priority Data

Dec. 11, 2020 (JP) .................. 2020-206012

(51) Int. Cl.
*B60R 16/02* (2006.01)
*H01B 7/00* (2006.01)
*H01B 9/02* (2006.01)

(52) U.S. Cl.
CPC ....... *B60R 16/0215* (2013.01); *H01B 7/0045* (2013.01); *H01B 9/024* (2013.01)

(58) Field of Classification Search
CPC .. B60R 16/0215; H01B 7/0045; H01B 7/228; H01B 5/12; H01B 11/1033
See application file for complete search history.

(56) References Cited

U.S. PATENT DOCUMENTS 2,674,644 A * 4/1954 Goodloe ................ F16J 15/122
245/1
3,249,689 A * 5/1966 Davis ..................... H04N 7/164
348/E7.062

(Continued)

FOREIGN PATENT DOCUMENTS

| CN | 210080608 U | 2/2020 |
| JP | S63-115296 U | 7/1988 |
| JP | 2014-071974 A | 4/2014 |

*Primary Examiner* — Paresh Paghadal
(74) *Attorney, Agent, or Firm* — Oliff PLC

(57) ABSTRACT

A wire harness including: at least one electric wire; and a braided member that has a plurality of conductive strands that are braided together and surrounds an outer circumference of the at least one electric wire, wherein: the braided member includes an intersection where the strands intersect, and the intersection has a braid where the intersecting strands are double-braided.

6 Claims, 5 Drawing Sheets

(56) References Cited

U.S. PATENT DOCUMENTS

| | | | | |
|---|---|---|---|---|
| 4,154,430 | A * | 5/1979 | Pfarr, Jr. | H05F 3/02 |
| | | | | 256/45 |
| 4,642,416 | A * | 2/1987 | Rogner | H05K 9/0015 |
| | | | | 174/357 |
| 4,731,500 | A * | 3/1988 | Otsuka | H01B 5/12 |
| | | | | 174/355 |
| 6,688,141 | B1 * | 2/2004 | Kunzel | D04B 35/02 |
| | | | | 66/81 |
| 2004/0216908 | A1 * | 11/2004 | Yen | H01B 11/1033 |
| | | | | 174/390 |
| 2007/0079985 | A1 * | 4/2007 | Ferraiolo | E01F 7/045 |
| | | | | 174/117 M |
| 2010/0224736 | A1 * | 9/2010 | Chen | E04H 17/066 |
| | | | | 87/3 |
| 2013/0277083 | A1 * | 10/2013 | Gauckler | F16L 9/125 |
| | | | | 174/24 |

* cited by examiner

BRAIDED MEMBER AND WIRE HARNESS

BACKGROUND

The present disclosure relates to a braided member and a wire harness.

Conventionally, a wire harness mounted in a vehicle such as an automobile is provided with an electric wire and a braided member that surrounds the outer circumference of the electric wire. As disclosed in JP 2014-71974A, the braided member includes a plurality of conductive strands, for example. The strands are braided into a mesh where they successively intersect each other. At the portions where the strands intersect, intersecting strands intersect by overlapping each other. In the wire harness provided with the braided member, each strand extends in a spiral shape around the outer circumference of the electric wire. Such a braided member has an electromagnetic shielding function, for example.

SUMMARY

Incidentally, the wire harness is touched and bent by a worker during routing of the wire harness. Thus, there is a possibility that strands of the braided member will move relative to each other and that an interval between strands will change. When an interval between strands changes, strands of the braided member deviate. Deviation of strands of the braided member forms portions where the mesh holes formed by the strands are large. In the braided member, the portions where the mesh holes formed by the strands are large may have degraded electromagnetic shielding performance compared to portions where the mesh holes formed by the strands are small. That is, the braided member may have portions with degraded electromagnetic shielding performance.

An exemplary aspect of the disclosure provides a braided member and a wire harness with which it is possible to suppress the formation of portions with degraded electromagnetic shielding performance.

A braided member of the present disclosure is a braided member including: a plurality of conductive strands braided together; and at least one intersection where the strands intersect, wherein each intersection of the at least one intersection has a braid where the intersecting strands are double-braided.

A wire harness of the present disclosure is a wire harness including: including: at least one electric wire; and a braided member that has a plurality of conductive strands that are braided together and surrounds an outer circumference of the at least one electric wire, wherein: the braided member includes an intersection where the strands intersect, and the intersection has a braid where the intersecting strands are double-braided.

With the braided member and the wire harness of the present disclosure, it is possible to suppress the formation of portions with degraded electromagnetic shielding performance.

DETAILED DESCRIPTION OF EMBODIMENTS

Description of Embodiments of Disclosure

Figure 1:
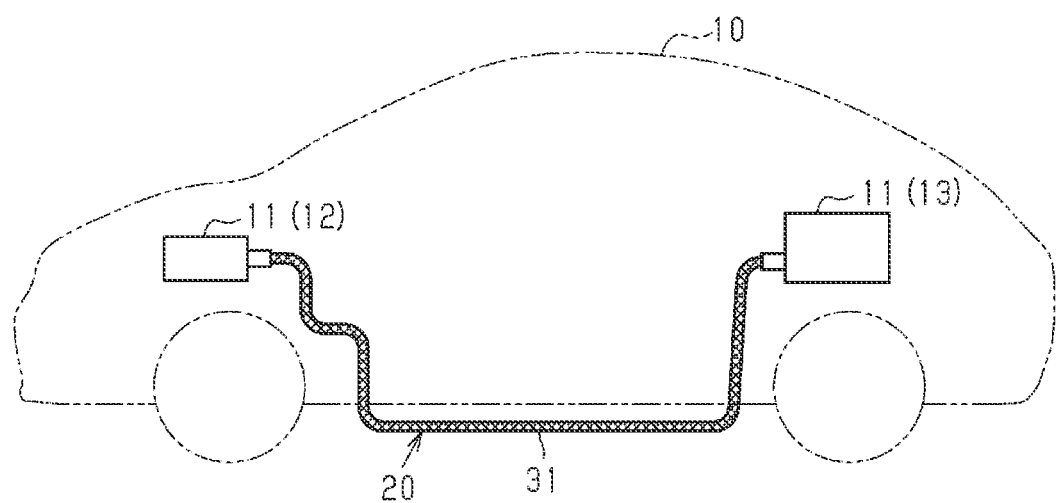
FIG. 1 is a schematic view of a wire harness mounted in a vehicle according to an embodiment.

First, embodiments of the present disclosure will be listed and described.

A braided member of the present disclosure is

[1] a braided member provided with a plurality of conductive strands braided together, the braided member including: at least one intersecting portion where the strands intersect, wherein each of the intersecting portions has a braided portion where the intersecting strands are double-braided.

With this configuration, at the intersecting portion including the braided portion where strands are double-braided, relative movement between the strands is limited by the braided portion. Thus, it is easier to suppress a partial increase in the size of mesh holes formed by the strands. Consequently, in a component covered with the braided member, it is possible to suppress the formation of portions with degraded electromagnetic shielding performance.

[2] It is preferable that each of the intersecting portions has the braided portion where the intersecting strands are double-braided only once.

With this configuration, it is possible to form a braided member whose mesh holes formed by the strands have a diamond shape. Also, the braided portion can be formed by double-braiding intersecting strands only once. Thus, compared to a case of forming a braided portion where intersecting strands are double-braided more than once, the braided portion can be easily formed. As a result, compared to a case of manufacturing a braided member that has a braided portion where intersecting strands are double-braided more than once, manufacturing of the braided member is facilitated.

[3] It is preferable that each of the intersecting portions has the braided portion where the intersecting strands are double-braided more than once.

With this configuration, a braided member whose mesh holes formed by the strands have a hexagonal shape can be formed. Also, compared to the braided portion where intersecting strands are only double-braided once, the braided portion where intersecting strands are double-braided more than once can more easily limit relative movement between the strands. Thus, it is easier to suppress a partial increase in the size of mesh holes formed by the strands. Consequently, the formation of portions with degraded electromagnetic shielding performance can be further suppressed. Also, the braided portions further suppress separation between the strands, and thus the braided member can be easily handled.

[4] It is preferable that, of interior angles of a mesh hole formed by the strands, a branch angle formed by two different strands that branch and extend from the intersecting portion and a bend angle formed by respective portions of one of the strands that extend on two sides of the intersecting portion are equal, or the bend angle is larger than the branch angle.

With this configuration, compared to a case where the branch angle is larger than the bend angle, the angle to which the strands are bent at the intersecting portion can be made less acute. Thus, the braided member can be easily manufactured.

[5] It is preferable that, of interior angles of a mesh hole formed by the strands, a first branch angle formed by two different strands that respectively branch and extend from the intersecting portion and a second branch angle formed by each strand extending from the intersecting portion and the intersecting portion are equal, or the second branch angle is larger than the first branch angle.

With this configuration, compared to a case where the first branch angle is larger than the second branch angle, the angle formed by the intersecting portion and a strand extending from the intersecting portion can be made less acute. Thus, the braided member can be easily manufactured.

[6] It is preferable that the strands each have a metal wire and a coating film covering an outer circumference of the metal wire.

With this configuration, the metal wire is protected by the coating film. Thus, it is possible to suppress breaking of the strands at the intersecting portion.

A wire harness of the present disclosure

[7] is a wire harness including: at least one electric wire; and a braided member that has a plurality of conductive strands that are braided together and surrounds an outer circumference of the at least one electric wire, wherein the braided member includes an intersecting portion where the strands intersect, and the intersecting portion has a braided portion where the intersecting strands are double-braided.

With this configuration, at the intersecting portion including the braided portion where the strands are double-braided, relative movement between the strands is limited by the braided portion. Thus, even if a worker touches or bends the wire harness when routing the wire harness, a partial increase in the size of mesh holes formed by the strands can be suppressed. Consequently, it is possible to suppress the formation of a portion with degraded electromagnetic shielding performance in the wire harness.

[8] It is preferable that the braided member has a sheet shape and is wrapped a plurality of turns around the outer circumference of the at least one electric wire.

With this configuration, the electromagnetic shielding performance realized by the braided member can be improved with a simple configuration.

[9] It is preferable that the braided member surrounds the outer circumference of the at least one electric wire such that each of the strands extend along a longitudinal axis of the at least one electric wire.

With this configuration, the strands can extend in the direction of transmission of a signal or current that flows through the electric wire, which is advantageous in improving the electromagnetic shielding performance of the braided member.

Detailed Description of Embodiments of Disclosure

Specific examples of a braided member and a wire harness of the present disclosure are described below with reference to the drawings. Note that the present disclosure is not limited to these examples, but is indicated by the claims, and all changes that come within the meaning and range of equivalency of the claims are intended to be embraced therein. Constituent elements may be enlarged in the appended drawings to facilitate comprehension. In the appended drawings, dimensional ratios of constituent elements parts may differ from actual dimensional ratios or from those in another drawing.

Embodiments of a braided member and a wire harness including the braided member are described below.

A wire harness 20 shown in FIG. 1 electrically connects two or three or more electrical devices to each other. The wire harness 20 is mounted in a vehicle 10 such as an automobile. The wire harness 20 electrically connects electrical devices 11 mounted in the vehicle 10 to each other. FIG. 1 only shows two of the electrical devices 11 mounted in the vehicle 10. The electrical devices 11 electrically connected to each other via the wire harness 20 are respectively, for example, an inverter 12 and a battery 13 installed on the rear side of the vehicle 10 relative to the inverter 12. The battery 13 is a battery capable of supplying a voltage in the magnitude of several tens to several hundreds of volts. Also, the inverter 12 generates AC power from DC power from the battery 13, and supplies the generated AC power to a motor (not shown). The motor is a wheel driving motor that acts as a motive power source for travel by the vehicle. The wire harness 20 is bent and routed to match the shape of a space for routing the wire harness 20, for example.

Configuration of Wire Harness 20

Figure 2:
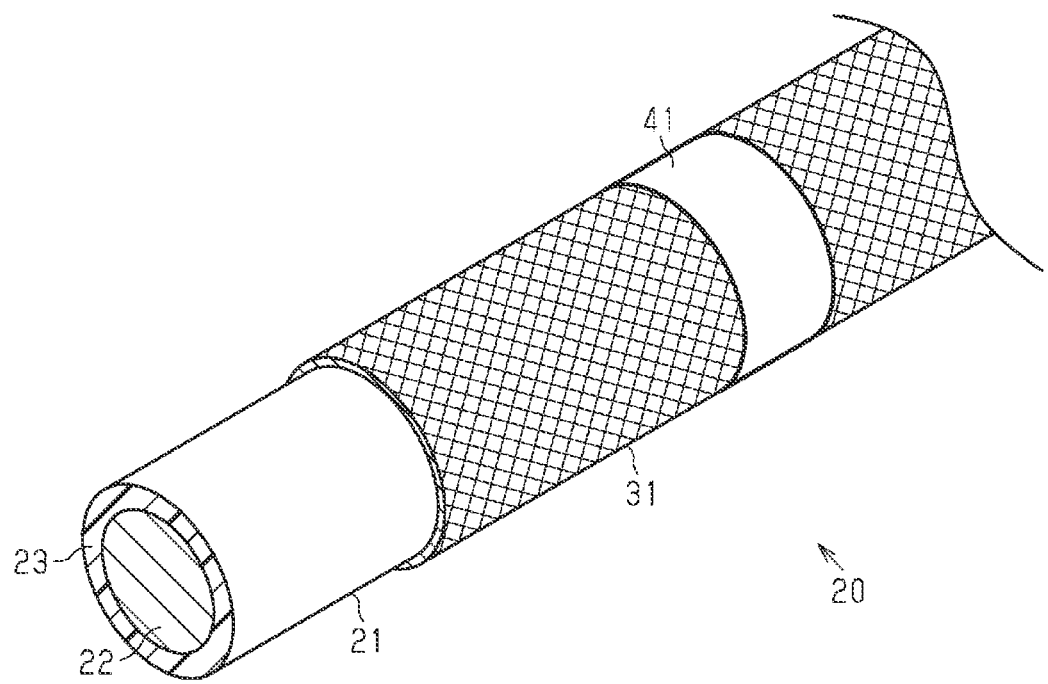
FIG. 2 is a perspective view schematically showing a portion of a wire harness according to an embodiment.

As shown in FIG. 2, the wire harness 20 includes at least one electric wire 21 and a braided member 31 that surrounds the outer circumference of the electric wire 21. The wire harness 20 has one electric wire 21, for example.

Configuration of Electric Wire 21

The electric wire 21 is, for example, a coated electric wire that has a core wire 22 made of a conductor and an insulating coating 23 that covers the outer circumference of the core wire 22. Connectors (not shown) for electrically connecting the electric wire 21 to the electrical devices 11 are respectively connected to two end portions of the electric wire 21.

The transverse sectional shape of the electric wire 21 is a circle shape, for example. Note that the transverse sectional shape of the electric wire 21 is not limited to a circle shape and can be any shape. The transverse sectional shape of the electric wire 21 may be any one of, for example, a polygonal shape, an oval shape, or an incomplete circle shape.

Configuration of Braided Member 31

Figure 3:
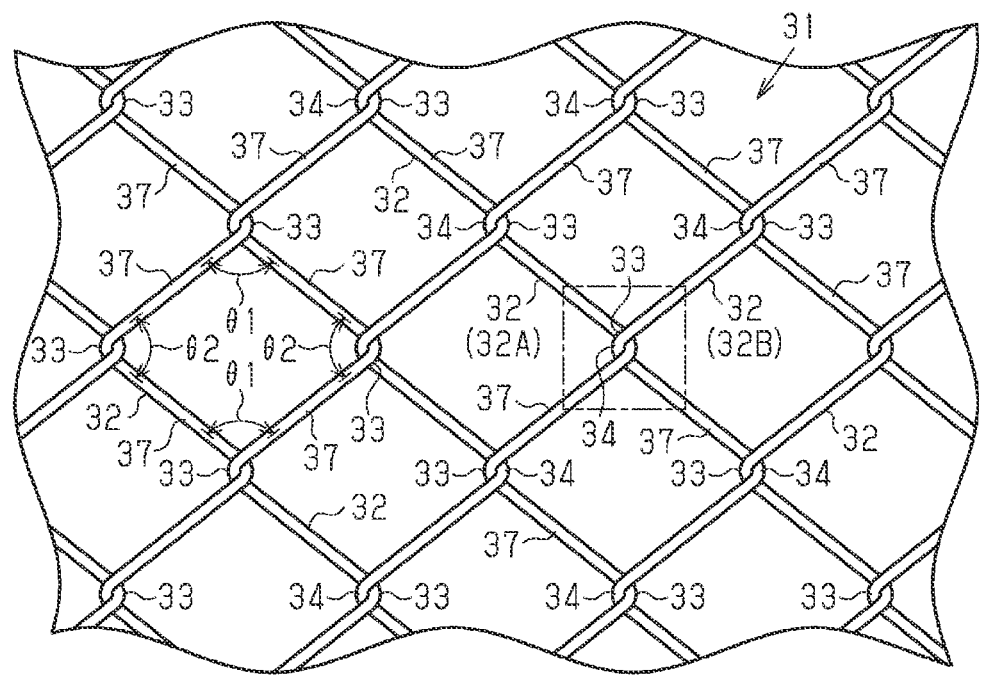
FIG. 3 is a partially enlarged view of a braided member according to an embodiment.

As shown in FIG. 3, the braided member 31 includes a plurality of conductive strands 32 braided together. The strands 32 are metal strands, for example. As the material of the strands 32, aluminum or an aluminum alloy is used, for example. Note that, as long as a conductive material is used, the material of the strands 32 is not limited to being aluminum or an aluminum alloy. For example, copper or a copper alloy can also be used as the material of the strands 32.

The strands 32 are braided into a sheet shape, for example. The braided member 31 includes intersecting portions 33 (intersections) where strands 32 intersect each other. At least one intersecting portion 33 has a braided portion 34 (braid) where intersecting strands 32 are double braided. For example, each intersecting portion 33 has a braided portion 34.

Figure 4:
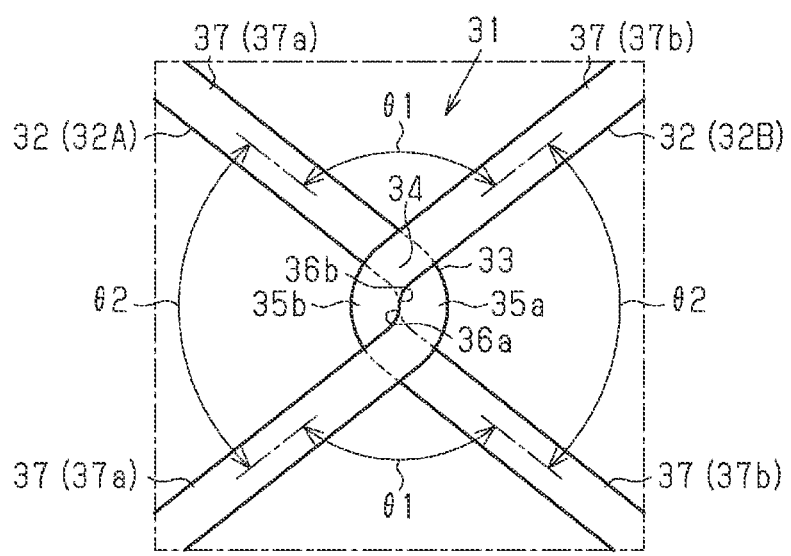
FIG. 4 is a partially enlarged view of the braided member according to an embodiment.

As shown in FIGS. 3 and 4, each intersecting portion 33 has a braided portion 34 where intersecting strands 32 of the intersecting portion 33 are only double-braided once around each other, for example. Note that double-braiding may also be referred to as rope braiding. FIG. 4 is an enlarged view of the portion in FIG. 3 demarcated by a dot-dash line.

The two intersecting strands 32 of each intersecting portion 33 are referred to as strands 32A and 32B, respectively. The strand 32A and the strand 32B of the intersecting portion 33 are only double-braided once by twisting the strands such that the upper and lower positions of the strands in the overlapping portions are interchanged. In this way, the portion where the strands 32A and 32B are double-braided is the braided portion 34.

At the braided portion 34 where the strand 32A and the strand 32B are double-braided once, the strand 32A has one peak portion 35a and the strand 32B has one peak portion 35b. Also, the strand 32A has the peak portion 35a, and thus has a valley portion 36a on the back of the peak portion 35a. Similarly, the strand 32B has the peak portion 35b, and thus has a valley portion 36b on the back of the peak portion 35b), At the braided portion 34, the valley portion 36a of the strand 32A and the valley portion 36b of the strand 32B are fitted together.

Each strand 32 has a zig-zag shape such as a continuous Z-shape, for example, as a result of intersecting strands 32 being double-braided once in the intersecting portions 33. Note that each strand 32 may have a zig-zag shape such as a continuous V-shape or U-shape by double-braiding intersecting strands 32 at the intersecting portions 33 once. The strands 32 are bent back at each intersecting portion 33.

Each intersecting portion 33 has a braided portion 34 that has been double-braided once, and thus the braided member 31 has a diamond wire net shape, for example. Thus, in the braided member 31, the mesh holes formed by the strands 32 are diamond shaped.

In each strand 32, the portion extending from the intersecting portion 33 to the next intersecting portion 33, that is, the portion coupling two intersecting portions 33, is a coupling portion 37. The coupling portions 37 extend linearly.

Of the interior angles of mesh holes formed by the strands 32, a branch angle θ1 formed by two different strands 32 that branch and extend from an intersecting portion 33 may be larger than a bend angle θ2 formed by respective portions of a strand 32 that extend on two sides of the intersecting portion 33. Here, the coupling portions 37 of one strand 32A of the intersecting strands 32A and 32B of the intersecting portion 33 are coupling portions 37a. Also, the coupling portions 37 of the other strand 32B of the strands 32A and 32B of the intersecting portion 33 are coupling portions 37b. The branch angle θ1 is an interior angle of, for example, a square mesh hole formed by the strands 32, and is formed by a coupling portion 37a and a coupling portion 37b branching from the intersecting portion 33, for example. The angle formed by the coupling portion 37a and the coupling portion 37b is an angle formed by the central axis of the coupling portion 37a and the central axis of the coupling portion 37b. Also, the bend angle θ2 is an interior angle of a mesh hole formed by the strands 32, and is, for example, an angle formed by two coupling portions 37a of the strand 32A that respectively extend on two sides of the intersecting portion 33. The angle formed by the two coupling portions 37a is an angle formed by the central axes of the two coupling portions 37a. The bend angle θ2 is also the interior angle of a mesh hole formed by the strands 32, and is, for example, formed by two coupling portions 37b of the strand 32B that respectively extend on two sides of the intersecting portion 33. The angle formed by the two coupling portions 37b is an angle formed by the central axes of the two coupling portions 37b. For example, the branch angle θ1 is an obtuse angle and the bend angle θ2 is an acute angle.

As shown in FIG. 2, the sheet-shaped braided member 31 is wrapped around the outer circumference of the electric wire 21. The braided member 31 is wrapped once around the outer circumference of the electric wire 21, for example. The wire harness may have a fixing member 41 that fixes the braided member 31 wrapped around the outer circumference of the electric wire 21. The fixing member 41 may be a piece of adhesive tape, a zip tie, or the like. The fixing member 41 is wrapped around the braided member 31 from the outer circumference of the braided member 31 wrapped around the outer circumference of the electric wire 21. By wrapping the fixing member 41 around the braided member 31, the braided member 31 is kept in a tubular shape.

End Processing of Braided Member 31

Figure 5:
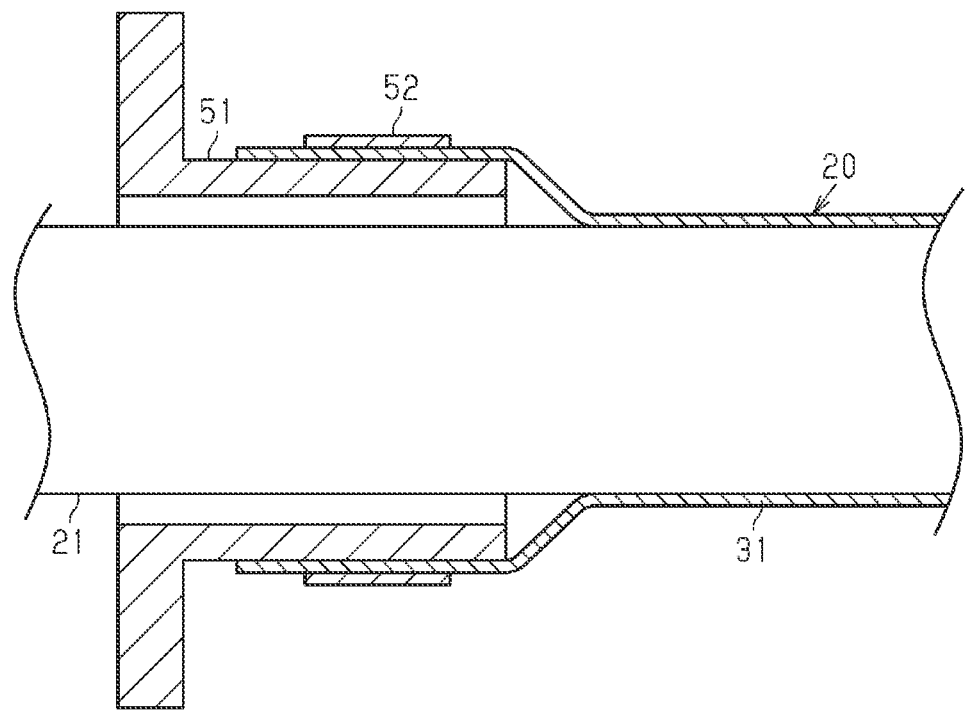
FIG. 5 is a cross-sectional view schematically showing an end portion region of the wire harness according to an embodiment.

As shown in FIG. 5, an end portion of the tubular braided member 31 is electrically connected to a shielding shell 51. The shielding shell 51 has a tubular shape, for example. The shielding shell 51 is fixed by being bolted to a case (not shown) of an electrical device 11. A connector provided at an end portion of the electric wire 21 is electrically connected to the electrical device 11, inside the shielding shell 51 or inside the case of the electrical device 11. The end portion region of the braided member 31 is placed over the shielding shell 51 so as to cover the outer circumference of the shielding shell 51. A crimp ring 52 is fitted to the shielding shell 51 from the outer circumference of the braided member 31. Thus, the end portion region of the braided member 31 is sandwiched between the shielding shell 51 and the crimp ring 52. The braided member 31 is electrically connected to the shielding shell 51 as a result of the end portion region of the braiding member 31 being sandwiched between the shielding shell 51 and the crimp ring 52.

Operation

Operation of the present embodiment will be described.

The intersecting portion 33 where the strands 32 intersect has the braided portion 34 where intersecting strands 32 are double-braided, Thus, at each intersecting portion 33 having the braided portion 34, the intersecting strands 32 restrain each other so as to suppress relative movement therebetween. Accordingly, the position of each strand 32 where it intersects another strand 32 is kept from changing in the direction in which the strand 32 extends. Consequently, the size of mesh holes formed by the strands 32 is equal to the maximum size they can be opened to, regardless of the mesh hole. Thus it is possible to suppress the formation of a portion where the size of mesh holes formed by the strands 32 is partially extremely large.

Effects of the present embodiment will be described.

(1) The braided member 31 includes the conductive strands 32 that are braided together. The braided member 31 includes the intersecting portions 33 where the strands 32 intersect. Each intersecting portion 33 has a braided portion 34 where the intersecting strands 32 are double-braided.

With this configuration, at the intersecting portion 33 that has the braided portion 34 where the strands 32 are double-braided, relative movement between the strands 32 is limited by the braided portion 34. Thus, it is easier to suppress a partial increase in the size of mesh holes formed by the strands 32. Consequently, in a component covered by the braided member 31, it is possible to suppress the formation of portions with degraded electromagnetic shielding performance.

(2) Each intersecting portion 33 has a braided portion 34 where the intersecting strands 32 are double-braided only once.

With this configuration, it is possible to form a braided member 31 whose mesh holes formed by the strands 32 have a diamond shape. Also, the braided portion 34 can be formed by double-braiding the intersecting strands 32 only once. Thus, compared to a case of forming a braided portion where intersecting strands are double-braided more than once, the braided portion 34 can be formed more easily. Consequently, compared to a case of manufacturing a braided member having a braided portion where intersecting strands are double-braided more than once, manufacturing of the braided member 31 is facilitated.

(3) The wire harness 20 includes at least one electric wire 21, and the braided member 31 including conductive strands 32 that are braided together and that surrounds the outer circumference of the at least one electric wire 21. The braided member 31 includes the intersecting portion 33 where the strands 32 intersect each other. The intersecting portion 33 has the braided portion 34 where intersecting strands 32 are double-braided.

With this configuration, at the intersecting portion 33 including the braided portion 34 where the strands 32 are double-braided, relative movement between the strands 32 can be limited by the braided portion 34. Thus, even if a worker touches or bends the wire harness 20 when routing the wire harness 20, a partial increase in the size of mesh holes formed by the strands 32 can be suppressed. Consequently, it is possible to suppress the formation of a portion with degraded electromagnetic shielding performance in the wire harness 20.

The present embodiment can be modified and implemented as described below. The present embodiment and the following modifications can be combined and implemented, provided that no technical contradiction arises.

Figure 6:
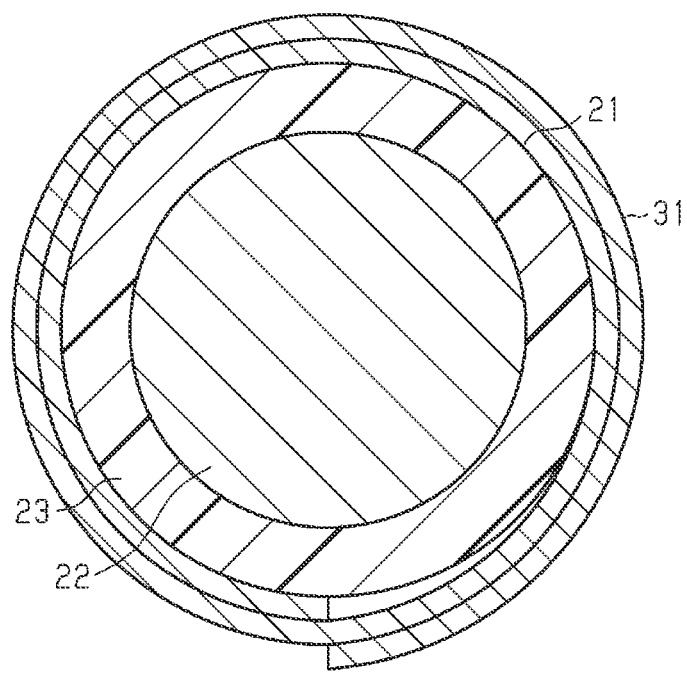
FIG. 6 is a cross-sectional view schematically showing a wire harness according to a variation.
Figure 7:
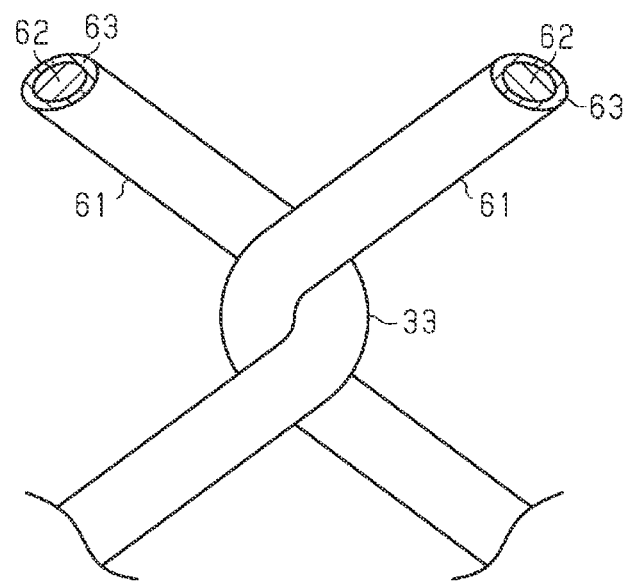
FIG. 7 is a partially enlarged view of a braided member according to a variation.

As shown in FIG. 6, the braided member 31 may have a sheet shape, and be wrapped a plurality of turns around the outer circumference of the electric wire 21. For example, in the example shown in FIG. 6, the braided member 31 is wrapped two turns around the outer circumference of the electric wire 21. In doing so, the electromagnetic shielding properties realized by the braided member 31 can be improved with a simple configuration.

In the above embodiment, the wire harness 20 includes only one electric wire 21. However, the wire harness 20 may have a plurality of electric wires 21. Note that, if the wire harness 20 includes a plurality of electric wires 21, the braided member 31 may collectively cover the outer circumferences of the electric wires 21. Also, in the same case, the wire harness 20 may include a plurality of braided members 31, The braided members 31 may individually cover the outer circumferences of the electric wires 21.

The wire harness 20 may also include an exterior member that covers the outer circumference of the braided member 31. The exterior member may be a corrugated tube, for example.

As shown in NG. 7, the braided member 31 may include strands 61 in place of the strands 32. Each strand 61 has a metal wire 62 and a coating film 63 that covers the outer circumference of the metal wire 62. The material of the metal wire 62 may be aluminum, an aluminum alloy, copper, a copper alloy, or the like. Also, it is sufficient that the coating film 63 protects the metal wire 62 by covering the outer circumference of the metal wire 62. In doing so, the metal wire 62 is protected by the coating film 63. Thus, it is possible to suppress breaking of the strands 61 at the intersecting portions 33.

Figure 8:
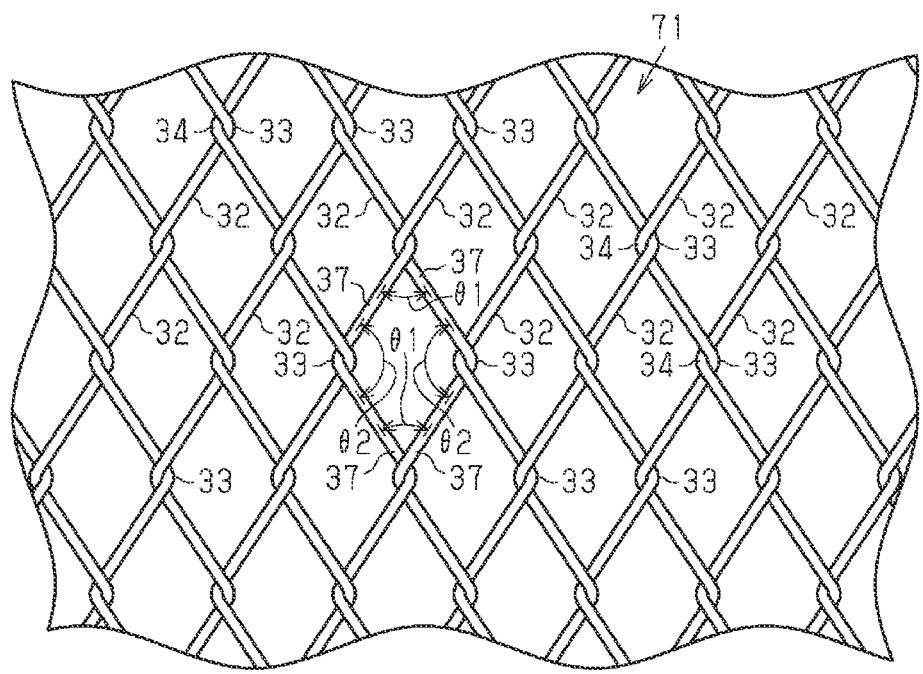
FIG. 8 is a partially enlarged view of a braided member according to a variation.

As shown in FIG. 8, the branch angle θ1 and the bend angle θ2 may be equal, or the bend angle θ2 may be larger than the branch angle θ1. In a braided member 71 illustrated in FIG. 8, the branch angle θ1 is smaller than the bend angle θ2, for example. In doing so, compared to a case where the branch angle θ1 is larger than the bend angle θ2, the angle to which the strands 32 are bent at the intersecting portion 33 can be made less acute. Thus, the braided member 71 can be easily manufactured. Also, it is possible to suppress breakage of the strands 32 at the intersecting portion 33.

Figure 9:
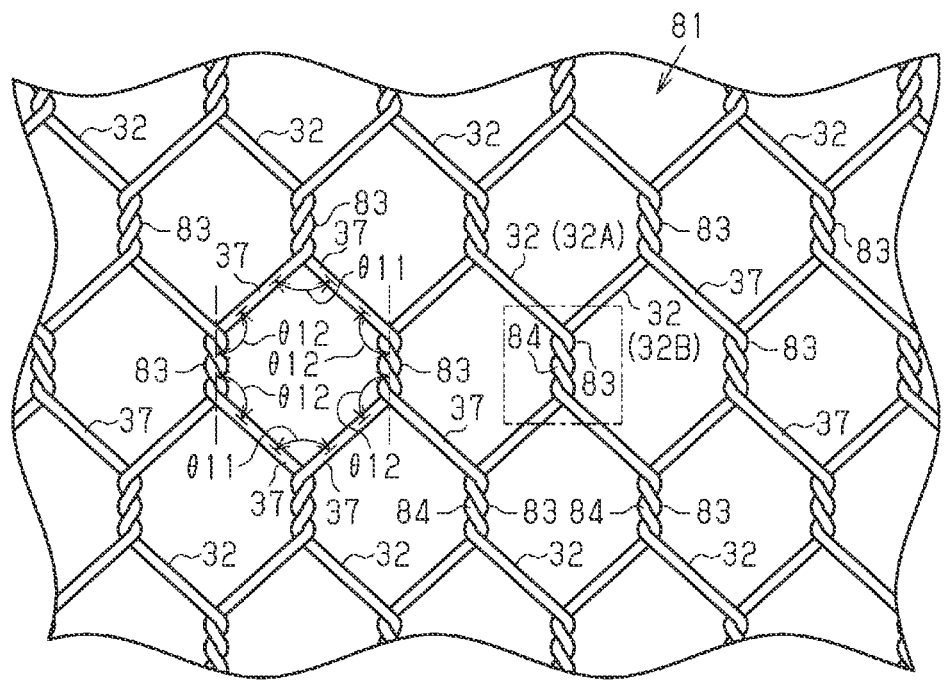
FIG. 9 is a partially enlarged view of a braided member according to a variation.
Figure 10:
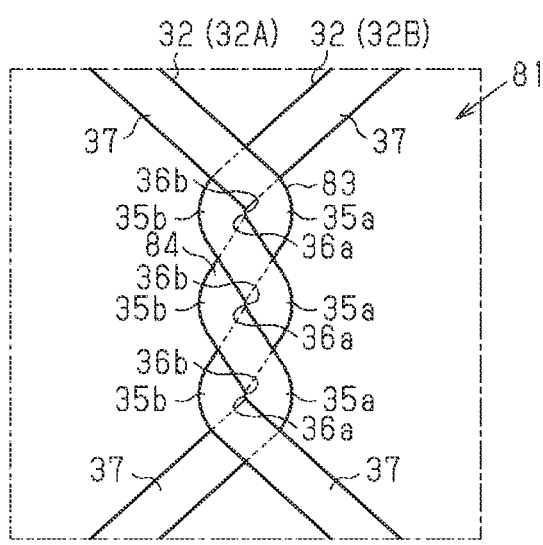
FIG. 10 is a partially enlarged view of a braided member according to a variation.

As with a braided member 81 shown in FIGS. 9 and 10, an intersecting portion 83 may be provided in place of the intersecting portion 33 of the above embodiment. FIG. 10 is an enlarged view of a portion in FIG. 9 demarcated with a dot-dash line. Note that, in the example shown in FIGS. 9 and 10, the same reference signs are given to the same or corresponding configurations as those of the above embodiment. Each intersecting portion 83 includes a braided portion 84 where intersecting strands 32 are double-braided more than once. At the braided portion 84, intersecting strands 32 are double braided an odd number of times of three or more, for example. As a result of the intersecting portions 83 each having the braided portion 84 where strands are double-braided more than once, the braided member SI has a chicken wire shape. Thus, in the braided member 81, the shape of the mesh holes formed by the strands 32 is a hexagonal shape. Specifically, each mesh hole has a hexagonal shape formed by four coupling portions 37 and two intersecting portions 83.

Two intersecting strands 32 at each of the intersecting portions 83 are strands 32A and 32B. The strand 32A and the strand 32B are double-braided three times by twisting the strands three times at the intersecting portion 83 such that, the upper and lower positions of the strands in the overlapping portions are interchanged. As such, the portion where the strands 32A and 32B are double-braided more than once is the braided portion 84. The intersecting portion 83 including the braided portion 84 has a rod shape, for example.

In the braided portion 84 where the strand 32A and the strand 32B are double-braided three times, the strand 32A has three peak portions 35a in the braided portion 84, and the strand 32B has three peak portions 35b in the braided portion 84. Also, the strand 32A has valley portions 36a on the back of each peak portion 35a. Similarly, the strand 32B has valley portions 36b on the back of each peak portion 35b. In the braided portion 84, the valley portions 36a of the strand 32A and the valley portions 36b of the strand 32B are fitted to each other, correspondingly. By double-braiding and bending back the intersecting strands 32 of the intersecting portion 83 three times, each strand 32 has a zig-zag shape.

In doing so, a braided member 81 whose mesh holes formed by the strands 32 have a hexagonal shape can be formed. Also, compared to the braided portion 34 where intersecting strands 32 are only double-braided once, the braided portion 84 where intersecting strands 32 are double-braided more than once can more easily limit relative movement between the strands 32. Thus, it is easier to suppress a partial increase in the size of mesh holes formed by the strands 32, Consequently, the formation of a portion with degraded electromagnetic shielding performance can be further suppressed. Also, the braided portions 84 further suppress separation between the strands 32, and thus the braided member 81 can be easily handled.

Note that, in this example, of the interior angles of the mesh holes formed by the strands 32, a first branch angle θ11 formed between two different strands 32 branching and extending from the intersecting portion 83 and a second branch angle θ12 formed by a strand 32 extending from the intersecting portion 83 and the intersecting portion 83 may be equal, or the second branch angle θ12 may be larger than the first branch angle θ11. The first branch angle θ11 is an angle formed between the coupling portion 37 of one of two different strands 32 respectively branching from the intersecting portions 83 and the coupling portion 37 of the other strand 32. Note that the angle formed by the coupling portion 37 of one strand 32 and the coupling portion 37 of the other strand 32 is an angle formed by the central axes of the two coupling portions 37. The second branch angle θ12 is an angle formed by the intersecting portion 83 and a coupling portion 37 extending from the intersecting portion 83, and is formed on the inner side of a formed mesh hole including the intersecting portion 83 and the coupling portion 37. The angle formed by the intersecting portion 83 and the coupling portion 37 is an angle formed by the central axis of the intersecting portion 83 and the central axis of the coupling portion 37.

In doing so, compared to a case where the first branch angle θ11 is larger than the second branch angle θ12, the angle formed by the intersecting portion 83 and a strand 32 extending from the intersecting portion 83 can be made less acute. Thus, the braided member 81 can be easily manufactured. Also, it is possible to suppress breakage of the strands 32 at the intersecting portion 83.

The braided member 31 may include both the intersecting portion 33 that has the braided portion 34 where the intersecting strands 32 are double-braided only once, and the intersecting portion 83 that has the braided portion 84 where the intersecting strands 32 are double-braided more than once. Also, provided that at least one intersecting portion 33 of the braided member 31 is provided with the braided portion 34, all of the intersecting portions 33 do not necessarily need to include the braided portion 34. Note that, in the braided member 31, it is preferable that a plurality of the intersecting portions 33 each include the braiding portion 34.

In the above embodiment, the braided member 31 has a sheet shape. However, the braided member 31 may be obtained by braiding the strands 32 into a tubular shape.

In the above embodiment, the inverter 12 and the battery 13 were given as examples of the electrical devices connected by the wire harness 20, However, the electrical devices 11 connected by the wire harness 20 are not limited to an inverter and a battery, and it is sufficient that the electrical devices 11 are mounted in the vehicle 10. Note that the electrical devices 11 also include control apparatuses and the like. Also, the wire harness 20 may be mounted on an apparatus other than the vehicle 10.

As shown in FIGS. 2, 5, and 6, the braided member 31 may form a roll that surrounds the outer circumference of the electric wire 21 or the longitudinal axis of the electric wire 21. For example, the braided member 31 may surround the outer circumference of the electric wire 21 or the longitudinal axis of the electric wire 21 such that the strands 32 of the braided member 31 run or extend along the longitudinal axis of the electric wire 21. For example, in the braided member 31 shown in FIG. 3, the strands 32 may run or extend in a zig-zag shape in the up-down direction of FIG. 3, and the up-down direction of FIG. 3 may be parallel with the longitudinal axis of the electric wire 21 or extend along the longitudinal axis of the electric wire 21, and the left-right direction of FIG. 3 may be the circumferential direction of the electric wire 21 or a direction that intersects the longitudinal direction of the electric wire 21. In the examples shown in FIG. 8 and FIG. 9 as well, the up-down direction may be parallel to the longitudinal axis of the electric wire 21 or extend along the longitudinal axis of the electric wire 21, and the left-right direction may be the circumferential direction of the electric wire 21 or a direction that intersects the longitudinal direction of the electric wire 21.

As shown in FIG. 3, each strand 32 of the braided member 31 may intersect only two other adjacent strands 32 (for example, adjacent strands in the circumferential direction of the electric wire 21) in the left-right direction of FIG. 3. This similarly applies to each strand 32 of the braided members 71 and 81 in the examples shown in FIGS. 8 and 9 as well. For example, the strands 32 can include a first strand, two second strands that are adjacent to the first strand and intersect the first strand, and two third strands that are respectively adjacent to the two second strands and respectively intersect the two second strands, and the first strand may intersect the two second strands, and the first strand need not intersect the two third strands.

As shown in FIGS. 3, 8, and 9, the braided members 31, 71, and 81 may include a plurality of conductive strands 32 extending in the same direction, and the strands 32 may be double-braided with two adjacent strands 32.

The invention claimed is:

1. A braided member comprising:
a plurality of conductive strands braided together; and
at least one intersection where the strands intersect,
wherein each intersection of the at least one intersection has a braid where the intersecting strands are double-braided only once,
wherein, of interior angles of a mesh hole formed by the strands, a branch angle formed by two different strands that branch and extend from the at least one intersection is smaller than a bend angle formed by respective portions of one of the strands that extend on two sides of the at least one intersection, and
wherein the plurality of conductive strands braided together have a sheet shape, which is wrapped a plurality of turns around an outer circumference of an electric wire.

2. The braided member according to claim 1,
wherein, of the interior angles of the mesh hole formed by the strands, a first branch angle formed by two different strands that respectively branch and extend from the at least one intersection and a second branch angle formed by (i) a strand extending from the at least one intersection and (ii) the at least one intersection are equal, or the second branch angle is larger than the first branch angle.

3. The braided member according to claim 1,
wherein the strands each have a metal wire and a coating film covering an outer circumference of the metal wire.

4. A wire harness comprising:
at least one electric wire; and
the braided member according to claim 1, which has a plurality of conductive strands that are braided together and surrounds an outer circumference of the at least one electric wire.

5. The wire harness according to claim 4,
wherein the braided member has a sheet shape and is wrapped a plurality of turns around the outer circumference of the at least one electric wire.

6. The wire harness according to claim 4,
wherein the braided member surrounds the outer circumference of the at least one electric wire such that each of the strands extend along a longitudinal axis of the at least one electric wire.

\* \* \* \* \*